Jan. 1, 1935.  E. SCHLUETER  1,986,484
VALVE STOPPER
Filed Nov. 18, 1932
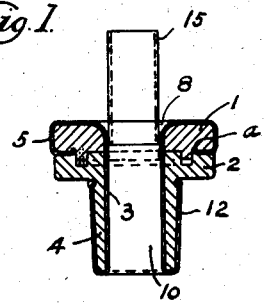
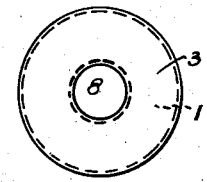
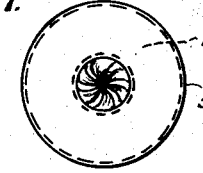
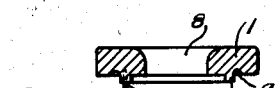
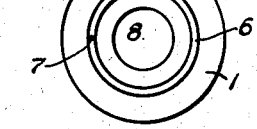
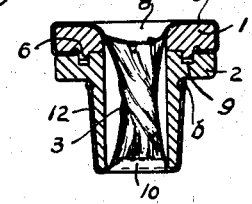
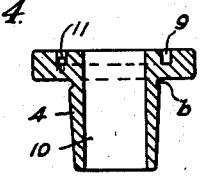
INVENTOR-
Ernest Schlueter
BY
Harold D. Penney, ATTORNEY- Patented Jan. 1, 1935

1,986,484

UNITED STATES PATENT OFFICE 1,986,484

VALVE STOPPER

Ernest Schlueter, Jamaica, N. Y.

Application November 18, 1932, Serial No. 643,146

13 Claims. (Cl. 221—60)

The present invention is directed to an improvement in stoppering devices and has for its primary object the provision of a simple opening stopper which may be used for bottles, tooth paste tubes, and many other manifold uses, wherein such a device is effective to be readily opened, and closed, in a leak tight manner.

One embodiment is shown in the present application, as a disclosure of the principle of operation, and it is obvious that many modifications may be made without departing from the spirit hereof or the scope of the appended claims.

In the drawing,

Fig. 1 is a longitudinal sectional view of my valve stopper assembled, showing the passage therethrough opened and unobstructed for the free passage therethrough of liquids or fluids;

Fig. 2 is a sectional view of the rotatable top piece, removed from assembly;

Fig. 3 is a bottom view of said top piece;

Fig. 4 is a longitudinal sectional view of the main body of the closure;

Fig. 5 is a plan view thereof;

Fig. 6 is a longitudinal sectional view of the assembled valve closure, closed;

Fig. 7 is a plan view thereof;

Fig. 8 is a plan view of Fig. 1;

Fig. 9 is a view in elevation of a closure valve element; and Fig. 10 is a top view thereof.

The present structure comprises three parts, two of which are relatively movable to one of the parts, for the purpose of effecting an opening-closing movement of the passages therethrough. To this end, there is a main, relatively non-movable body portion 4, having an integral top flange 2, in which an annular groove 9 may be cut therein. In the groove 9, at one point may be inserted a stop pin 11.

The body is provided with a passage bore 10 therein, preferably cylindrical in cross section, though the passage bore may be of any shape.

Rotatably mounted upon the grooved face of flange 2, as in Fig. 1, is a top annulus 1, which has an annular ledge 6 extending from its lower contact face, and this ledge is also provided with an extending stop pin 7. When the annulus 1 is in operative contact with the grooved face of flange 2, the ledge 6 just clears the top of stop pin 11 in groove 9, but stop pin 7 always contacts with and is stopped by pin 11 in groove 9, when the top annulus 1 and body 4 are relatively rotated, substantially in one full revolution.

The top annulus 1 and the body 4 are provided with bores 8 and 10, respectively, which make a continuous single passage through the assembled members, as in Fig. 1.

With the pins 7—11 contacting in one position in assembly, there is then introduced into the bore 8—10, a flexible or resilient tubular member 3, Figs. 9—10, which is open at both ends. In the present instance, this tubular closure, for small containers may be of a soft vulcanized rubber tissue, and, by stretching the upper end thereof, the tubular closure may be drawn down over the circumference of top annulus 1, as at 5, Fig. 1. It may, further, and in order to obtain a tight connection to annulus 1, have said end stretched so as to embrace the underface of said annulus 1, and the extreme end edge caught in a groove $a$, Figs. 1 and 2.

The other, or lower, end of the tubular closure 3 is then stretched, so as to encompass the entire body portion 4, as at 12 Fig. 1, the extreme end thereof being received in an annular groove $b$, Figs. 1 and 6.

As thus described, it will be noted that the closure tube 3, in its assembled position within the passage 8—10, hugs the faces of said passage, and is operatively held at its end extremes to both of the members 1 and 4 and is thereby held in operative position, open as in Figs. 1 and 8. When in this position and set in a bottle neck not shown but understood, that portion of the back turned portion of the tissue as at 12, Fig. 1, acts as a resilient covering to cause the stopper to fit tight in the bottle opening.

In order to close the opening, the annulus 1 is grasped between the fingers and rotated, from the first, above noted stop pin position, full around until the pins 7—11 meet on opposite faces, in the other extreme of rotation. By thus doing the resilient tubular closure within the bore 8—10 is twisted as at 3, Fig. 6, and as indicated in Fig. 7, completely closes the passage bore 8—10. In the simple construction herein outlined for the enumerated uses, this closure has withstood a fluid pressure of about forty pounds per square inch.

In larger size, heavy duty closures, such as valves for pipe lines, or passage cut-off devices of any kind, close woven fabric tubes of high tensile strength, treated to render them leak proof against fluids and liquids and fixedly mounted at their ends within and to relatively movable passage forming members, with the bore contacting portions of the tubular closure means and the passage forming members relatively free to be rotated, may also be used, so that the operation thereof may also be accomplished to close the passage by twisting the tubular member and open by untwisting the same.

It is further obvious that the twisting closure of the tubular closure member may be regulated so that any desired opening from full to tight closure of the passage may be accomplished, thereby to control the volume flow of fluids or liquids therethrough.

Further the twist closure is of such a nature that its formation when closed is able to resist pressures of equal force from either axial direction.

In Fig. 1 there is disclosed, the provision of a tubular pouring spout 15. This spout may be of any suitable rigid material and it may be forced into the aperture 8, thus clamping the tubular closure member 3 to the bore of annulus 1. As thus shown a modified form of holding the tubular closure member to the operative member is shown, and at the same time forms a pouring spout for liquids, without in any way interfering with the efficient action of the closure.

Having thus described my invention what I claim is:

1. In combination, a pair of relatively revolvable members having registering openings passing therethrough, and a flexible tubular element disposed in said openings and having its opposite ends rigid with said members.

2. A valve including in combination a pair of relatively rotatable members having engaging inner faces, said members having an axial passage disposed therethrough, a resilient tube disposed in said passage and having its opposite ends rigid with the outer faces of said members, whereby on rotation of one of said members said tube may be twisted to close said passage.

3. A valve comprising in combination a pair of cooperating relatively revolvable members having aligned openings, said members having engaging inner faces and said openings being disposed axially of said members to provide a passage therethrough, a tubular shell of resilient material freely engaging the boundary face of said passage and having its opposite ends rigid with the outer faces of said members, whereby on rotation of one of said members said material may be stretched and twisted to close said passage, said material adapted to hold the first mentioned faces engaged.

4. A valve including in combination a revolvable member having an axial opening, a relatively fixed member having an opening in registry with the first opening, so as to provide an axial passage, said members having adjoining inner faces; a pin projecting from the face of said revolvable member, a pin projecting from the face of said fixed member and normally spaced from the first pin, said pins being disposed on an arc having its center on said axis; and a tubular resilient shell freely engaging the face of said passage when said members are in the normal position, said shell having its opposed ends fixedly engaged on the outer faces of said members, whereby on revolution of the first mentioned member said shell may be stretched and twisted between its ends to close said passage, the pin of said revolvable member being adapted to be passed over the other pin and then engaged against the latter, whereby to prevent return of said revolvable member and to retain the passage closed.

5. In combination, a pair of relatively revolvable members having coacting inner faces, said members having therein registering opening which provide an axial passage and one of said member having an annular groove in its face, a tubular shell of resilient material freely engaging the boundary face of said passage and having its opposite ends fixedly disposed on the outer faces of said members, whereby on revolution of one of said members said shell may be twisted to close said passage, and means for guiding said members during the revolution, said means including an annular rib on the inner face of the other member, said rib being disposed in said groove.

6. A stopper including in combination an elongate body member which is adapted to be disposed in the opening of a container, said member having a flat end face, a relatively revolvable member including an outer face and having an inner face adjoining said flat face, said members having an axial passage extending therethrough, a resilient rubber tube disposed in said passage and having one of its ends fixedly mounted on said outer face, said tube having its opposite end fixedly embracing the outer face of the opposite end of said body member whereby to tightly engage the boundary face of said opening, so that when the second mentioned member is revolved the central portion of the tube may be twisted to close said passage.

7. A stopper including in combination an elongate body member which is adapted to be disposed in the opening of a container, said member having a flat end face, a relatively revolvable member including an outer face and having an inner face adjoining said flat face, said members having an axial passage extending therethrough, a resilient rubber tube disposed in said passage and having one of its ends fixedly mounted on said outer face, said tube having its opposite end fixedly embracing the outer face of the opposite end of said body member, whereby to engage the boundary face of the opening, so that when the second mentioned member is revolved the central portion of said tube may be twisted to close said passage, and means for releasably holding said revolvable member, said means including coacting pins which project from said adjoining faces.

8. A stopper including in combination an elongate body member which is adapted to be disposed in the opening of a container, an annular flange extending from one end of said member and having a flat face; a relatively revolvable member including a coacting flange and having an inner face adjoining said flat face, said members having an axial passage extending therethrough; a resilient rubber tube disposed in said passage and having one of its ends fixedly embracing the periphery of the second mentioned flange, said tube having its opposite end fixedly mounted on the outer face of the opposite end of said body member whereby to engage the boundary face of the opening, so that when the second mentioned member is revolved the central portion of said tube may be twisted to close said passage.

9. A stopper including in combination an elongate body member which is adapted to be disposed in the opening of a container, an annular flange extending from one end of said member and having a flat face, said member having therein at the base of the opposite face of said flange an annular groove; a relatively revolvable member including a coacting flange and having an inner face adjoining said flat face, said inner face having also therein an annular groove; said members having an axial passage extending therethrough; a resilient rubber tube disposed in said passage and having the edge portion of one of its ends fixedly disposed in the second mentioned groove, said end being passed over the periphery of the second mentioned flange; said tube having the edge portion of its opposite end fixedly disposed in the first mentioned groove, the second mentioned end of said tube being passed over the outer face of the opposite end of said body member whereby to sealingly engage the boundary face of said opening, so that when the second mentioned member is revolved the central portion of said tube may be twisted to close said passage.

10. A stopper including in combination an elongate body member which is adapted to be disposed in the opening of a container, said member having a flat end face, said face having therein an annular groove; a relatively revolvable member including an outer face and having an inner face adjoining said flat face; said members having an axial passage extending therethrough; a resilient rubber tube having its central portion freely engaging the boundary face of said passage, said tube including an end which is fixedly engaged on said outer face and having an opposite end fixedly mounted on the outer face of the opposite end of said body member whereby to engage the boundary face of said opening; and guide means including an annular ring on said inner face, said ring being movably disposed in said groove, so that as the second mentioned member is revolved said tube may be twisted to close said passage.

11. A stopper including in combination a relatively fixed member, said member including an elongate portion which is adapted to be disposed in the opening of a container, said member having a flat end face, said face having therein a deep annular groove, a second member revolvably mounted on the first member and having an outer face, an inner face adjoining said flat face; said members having an axial passage extending therethrough; a resilient rubber tube having its central portion freely lining the boundary face of said passage, said tube having one end fixedly engaged on said outer face and having its opposite end fixedly mounted on the outer face of said elongate portion, whereby to engage the boundary face of said opening; a shallow annular guide rib on said inner face, said rib being movably disposed in said groove, so that as the second mentioned member is revolved said tube may be twisted to close said passage; a stop pin disposed in the bottom of said groove, and a cooperating pin carried by said rib, whereby said pins may be engaged to prevent return movement of the second mentioned member.

12. A stopper comprising in combination a tubular member including an end having a flat face, a relatively revolvable member having a face adjoining said flat face, said revolvable member having a bore cooperating with the bore of said tubular member whereby to form an axial passage therethrough; a resilient rubber tube having its central portion freely engaging the boundary face of said passage, said tube having one of its ends tightly embracing the periphery of the opposite end of the tube of the first mentioned member whereby to sealingly engage in the opening of a container; means whereby the opposite end of said resilient tube is rigidly attached to said revolvable member; and means cooperating with said adjacent faces for guiding the revolution of said members, so that said central portion may be twisted to close said passage.

13. A stopper including in combination a body member having an end adapted to be attached in the opening of a container, a second member engaging the opposite end of the first member and revolvable relative thereto, said members having an axial passage therethrough; a resilient rubber tube having its central portion freely engaging the boundary face of said passage and having one end fixedly embracing the attaching end of said body member, and a rigid tube having its inner end attaching the opposite end of said resilient tube to the second mentioned member, whereby on revolution of the latter said central portion may be twisted or untwisted to close or open said passage, said rigid tube having its outer end projecting from the associated member so as to form a discharge spout.

ERNEST SCHLUETER.